(12) United States Patent
An et al.

(10) Patent No.: US 12,602,133 B2
(45) Date of Patent: Apr. 14, 2026

(54) TOUCH DRIVER, TOUCH DEVICE, AND DISPLAY DEVICE INCLUDING THE SAME

(71) Applicant: SAMSUNG ELECTRONICS CO., LTD., Suwon-si (KR)

(72) Inventors: Jun Yeol An, Seoul (KR); Yoon-Kyung Choi, Seoul (KR); Seung Hun Choi, Seoul (KR); Hyung-Min Lee, Seoul (KR)

(73) Assignees: SAMSUNG ELECTRONICS CO., LTD., Suwon-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 18/930,479

(22) Filed: Oct. 29, 2024

(65) Prior Publication Data

US 2025/0224836 A1 Jul. 10, 2025

(30) Foreign Application Priority Data

Jan. 5, 2024 (KR) ........................ 10-2024-0002288

(51) Int. Cl.
*G06F 3/041* (2006.01)
*G06F 3/044* (2006.01)
(52) U.S. Cl.
CPC ........ *G06F 3/0418* (2013.01); *G06F 3/04164* (2019.05); *G06F 3/044* (2013.01)
(58) Field of Classification Search
CPC .... G06F 3/0418; G06F 3/04164; G06F 3/044; G06F 3/0412; G06F 3/04182; G06F 3/0446; G06F 3/0416; H03F 3/45475
See application file for complete search history.

(56) References Cited

U.S. PATENT DOCUMENTS

| | | | |
|---|---|---|---|
| 7,504,587 | B2 | 3/2009 | Masu et al. |
| 11,287,931 | B2 | 3/2022 | Cheng et al. |

(Continued)

FOREIGN PATENT DOCUMENTS

| | | | |
|---|---|---|---|
| JP | 6670609 | B2 | 3/2020 |
| KR | 10-1606709 | B1 | 4/2016 |

(Continued)

OTHER PUBLICATIONS

Hwang et al., "A 6.9mW 120fps 28×50 Capacitive Touch Sensor with 41.7dB SNR for 1mm Stylus Using Current-Driven ΔE ADCs", IEEE Isscc Dig. Tech. Papers, 2017, pp. 170-171 (3 pages total).

(Continued)

*Primary Examiner* — Hong Zhou
(74) *Attorney, Agent, or Firm* — Sughrue Mion, PLLC

(57) ABSTRACT

A touch driver includes: a plurality of current conveyors connected to a plurality of touch electrodes, the plurality of current conveyor circuits configured to (i) receive a plurality of first currents from the plurality of touch electrodes, and (ii) generate a plurality of second currents having opposite directions to the plurality of first currents; a common current subtractor circuit configured to (i) receive the plurality of first currents and the plurality of second currents from the plurality of current conveyor circuits, and (ii) generate a plurality of output currents that are a sum of (a) a mean current of the plurality of second currents and (b) the plurality of first currents; a plurality of integrator circuits configured to generate a plurality of output voltages by integrating the plurality of output currents; and an analog-to-digital converter configured to convert the plurality of output voltages into digital signals corresponding to touch data.

18 Claims, 10 Drawing Sheets

(56) References Cited

U.S. PATENT DOCUMENTS

| | | | | |
|---|---|---|---|---|
| 2013/0063395 | A1* | 3/2013 | Byun | G06F 3/04184 |
| | | | | 345/173 |
| 2013/0257767 | A1* | 10/2013 | Wu | G09G 5/18 |
| | | | | 345/173 |
| 2015/0102827 | A1* | 4/2015 | Byun | G06F 3/04166 |
| | | | | 324/679 |
| 2017/0242502 | A1* | 8/2017 | Gray | G06F 3/04162 |
| 2017/0300148 | A1* | 10/2017 | Shimada | G06F 3/041662 |
| 2018/0046325 | A1* | 2/2018 | Kim | G06F 3/0412 |
| 2018/0348931 | A1* | 12/2018 | Kim | G09G 3/3225 |
| 2021/0048912 | A1* | 2/2021 | Cheng | G06F 3/05 |
| 2021/0191539 | A1 | 6/2021 | Cheng | |
| 2022/0035506 | A1 | 2/2022 | Zou | |
| 2022/0374147 | A1* | 11/2022 | Ko | G06F 3/041662 |

FOREIGN PATENT DOCUMENTS

| | | |
|---|---|---|
| KR | 10-2018-0089122 A | 8/2018 |
| KR | 10-2018-0090705 A | 8/2018 |
| KR | 10-2124622 B1 | 6/2020 |

OTHER PUBLICATIONS

Bae et al., "Session 26 Overview: Display and User Interaction Technologies", 2023 IEEE International Solid-State Circuits Conference, 2023, pp. 380-387 (11 pages total).

An et al., "Noise Immunity in Capacitive Sensing: Single-Ended AFE Design with Common-Current Subtraction for Mutual- and Self-Capacitance Sensing in 390pF Load", 2024 IEEE International Solid-State Circuits Conference, 2024, pp. 9-11 (3 pages total).

An, "A Low Noise Touch Sensor IC with Buffer Based Current Conveyors for On Cell Touch AMOLED Displays", Basic Lab, 2023, pp. 1-29 (30 pages total).

"Single-Ended AFE with Common-Current Subtraction for Mutual- and Self-Capacitance Sensing in 390pF Load", 30th Humantech Paper Award, pp. 1-9 (9 pages total).

Ito et al., "Techniques of Touch Sensing and Display Driving for Avoiding Display Artifacts for Flexible OLED Applications," SID Symp. Dig. Tech. Papers, 2022 (4 pages total).

Park et al., "A Pen-Pressure-Sensitive Capacitive Touch System Using Electrically Coupled Resonance Pen" IEEE J. Solid-State Circuits, 2016, vol. 51, No. 1, pp. 168-176 (9 pages total).

Park et al., "A 0.26-nJ/node, 400-KHz Tx Driving, Filtered Fully Differential Readout IC With Parasitic RC Time Delay Reduction Technique for 65-in 169 × 97 Capacitive-Type Touch Screen Panel", IEEE Journal of Solid-State Circuits, 2017, vol. 52, No. 2, pp. 528-542 (15 pages total).

Miyamoto et al., "A 143 81 Mutual-Capacitance Touch-Sensing Analog Front-End With Parallel Drive and Differential Sensing Architecture", IEEE Journal of Solid-State Circuits, 2015, vol. 50, No. 1, pp. 335-343 (9 pages total).

Hamaguchi et al., "A 240Hz-Reporting-Rate Mutual-Capacitance Touch-Sensing Analog Front-End Enabling Multiple Active/Passive Styluses with 41dB/32dB SNR for 0.5mm Diameter" IEEE ISSCC Dig. Tech. Papers, 2015, pp. 120-121 (3 pages total).

Park et al., "A 100-TRX-Channel Configurable 85-to-385Hz-Frame-Rate Analog Front-End for Touch Controller with Highly Enhanced Noise Immunity of 20Vpp", IEEE ISSCC Dig. Tech. Papers, 2016, pp. 210-211 (3 pages total).

Shin et al., "A 55dB SNR with 240Hz Frame Scan Rate Mutual Capacitor 30x24 Touch-Screen Panel Read-Out IC Using Code-Division Multiple Sensing Technique", IEEE ISSCC Dig. Tech. Papers, 2013, pp. 388-389 (3 pages total).

Jang et al., "2D Coded-Aperture-Based Ultra-Compact Capacitive Touch-Screen Controller with 40 Reconfigurable Channels", IEEE ISSCC Dig. Tech. Papers, 2014, pp. 218-219 (3 pages total).

Heo et al., "72 dB SNR, 240 Hz Frame Rate Readout IC With Differential Continuous-Mode Parallel Architecture for Larger Touch-Screen Panel Applications", IEEE Transactions on Circuits and Systems—I: Regular Papers, 2016, vol. 63, No. 7, pp. 960-971 (12 pages total).

Kim et al., "A Fully-Differential Capacitive Touch Controller with Input Common-Mode Feedback for Symmetric Display Noise Cancellation", Proc. IEEE Symp. VLSI Circuits, 2014, pp. 179-180 (2 pages total).

Yang et al., "A Highly Noise-Immune Touch Controller Using Filtered-Delta-Integration and a Charge-Interpolation Technique for 10.1-inch Capacitive Touch-Screen Panels", IEEE ISSCC Dig. Tech. Papers, 2013, pp. 390-391 (3 pages total).

Miura et al., "A 1 mm Pitch 80 × 80 Channel 322 Hz Frame-Rate Multitouch Distribution Sensor With Two-Step Dual-Mode Capacitance Scan", IEEE J. Solid-State Circuits, vol. 50, No. 11, pp. 2741-2749 (9 pages total).

Park et al., "A Reconfigurable 40-to-67 dB SNR, 50-to-6400 Hz Frame-Rate, Column-Parallel Readout IC for Capacitive Touch-Screen Panels", IEEE J. Solid-State Circuits, vol. 49, No. 10, pp. 2305-2318 (14 pages total).

An et al., "A 3.9kHz-Frame-Rate Capacitive Touch System with Pressure/Tilt Angle Expressions of Active Stylus Using Multiple-Frequency Driving Method for 65" 104x64 Touch Screen Panel", IEEE ISSCC Dig. Tech. Papers, 2017, pp. 168-169 (3 pages total).

Huh et al., "A 10.1" 56-Channel, 183 uW/electrode, 0.73 mm2/sensor High SNR 3D Hover Sensor Based on Enhanced Signal Refining and Fine Error Calibrating Techniques", Proc. IEEE Symp. VLSI Circuits, 2017, pp. C308-C309 (2 pages total).

Lee et al., "A 0.033-mm2 21.5-aF to 114.9-aF Resolution Continuous-Time ΔE Capacitance-to-Digital Converter Achieving Parasitic Capacitance Immunity Up to 480 pF" IEEE J. Solid-State Circuits, 2022, pp. 1-10 (10 pages total).

S. Byun, et al., "A 45.8dB-SNR . . . Antenna Reference," in IEEE ISSCC Dig. Tech. Papers, pp. 386-387, Feb. 2023.

Choi et al., "Implementation of Full-Panel Circuit Models for Interference Estimation Between Touch and Display Operation in On-Cell Touch AMOLED", SID Symp. Dig. Tech. Papers, 2022, pp. 24-26 (4 pages total).

* cited by examiner

TOUCH DRIVER, TOUCH DEVICE, AND DISPLAY DEVICE INCLUDING THE SAME

CROSS-REFERENCE TO RELATED APPLICATION

This application claims priority to and the benefit of Korean Patent Application No. 10-2024-0002288 filed in the Korean Intellectual Property Office on Jan. 5, 2024, the entire contents of which are incorporated herein by reference.

BACKGROUND

1. Field

The present disclosure relates to a touch driver, a touch device, and a display device including the same.

2. Description of Related Art

In general, a display panel provides various visual information to a user by displaying an image. The display panel includes pixels, and each of the pixels expresses light at a predetermined luminance to display images. A Display Driver Integrated Circuit (DDI) is used to drive the pixels.

Recently, various electronic devices are equipped with a display panel capable of sensing touches. The display panel capable of sensing a touch may separately include a touch panel provided with a touch element for sensing a touch, or may include a touch element in the display panel. In operation, a touch driver IC applies a driving signal to the touch element and senses a change in the signal from the touch element due to the touch. To remove noise from the touch signal, a noise profile (e.g., a differential profile) obtained by subtracting the voltage or current components of adjacent touch electrodes from the touch signal is converted into a single profile. However, there is a problem with noise accumulating on a single profile.

SUMMARY

The present disclosure attempts to provide a touch driver for reducing influences of noise from a display panel, a touch device, and a display device including them.

The present disclosure attempts to provide a touch driver for increasing a signal-to-noise ratio (SNR) of signals caused by touches, a touch device, and a display device including them.

According to an aspect of the disclosure, a touch driver comprises: a plurality of current conveyor circuits connected to a plurality of touch electrodes, the plurality of current conveyor circuits configured to (i) receive a plurality of first currents from the plurality of touch electrodes, and (ii) generate a plurality of second currents having opposite directions to the plurality of first currents; a common current subtractor circuit configured to (i) receive the plurality of first currents and the plurality of second currents from the plurality of current conveyors, and (ii) generate a plurality of output currents that are a sum of (a) a mean current of the plurality of second currents and (b) the plurality of first currents; a plurality of integrator circuits configured to generate a plurality of output voltages by integrating the plurality of output currents; and an analog-to-digital converter circuit configured to convert the plurality of output voltages into digital signals corresponding to touch data.

According to an aspect of the disclosure, a touch device comprises: a plurality of first touch electrodes extending in a first direction and aligned in a second direction crossing the first direction; a plurality of second touch electrodes extending in the second direction and aligned in the first direction; and a touch driver configured to (i) apply a plurality of first driving signals to the plurality of first touch electrodes, (ii) receive a plurality of first currents from the plurality of second touch electrodes, and (iii) generate first touch data based on a plurality of first output currents that are a sum of (a) a first mean current that is a mean of a plurality of first opposite currents having an opposite direction to the plurality of first currents and (b) a respective first current of the plurality of first currents.

According to an aspect of the disclosure, a display device comprises: a first panel comprising a plurality of pixels; a second panel on the first panel, the second panel comprising a plurality of touch electrodes; and a driving circuit configured to (i) provide a plurality of data signals that correspond to a plurality of pixels to the plurality of pixels of the first panel, (ii) receive a plurality of first currents from the plurality of touch electrodes, (iii) subtract a mean current of the plurality of first currents from the plurality of first currents, and (iv) generate a plurality of touch data based on the subtracted currents.

BRIEF DESCRIPTION OF DRAWINGS

FIG. 1 shows a block diagram of a touchable display device according to one or more embodiments.

DETAILED DESCRIPTION

Figure 2:
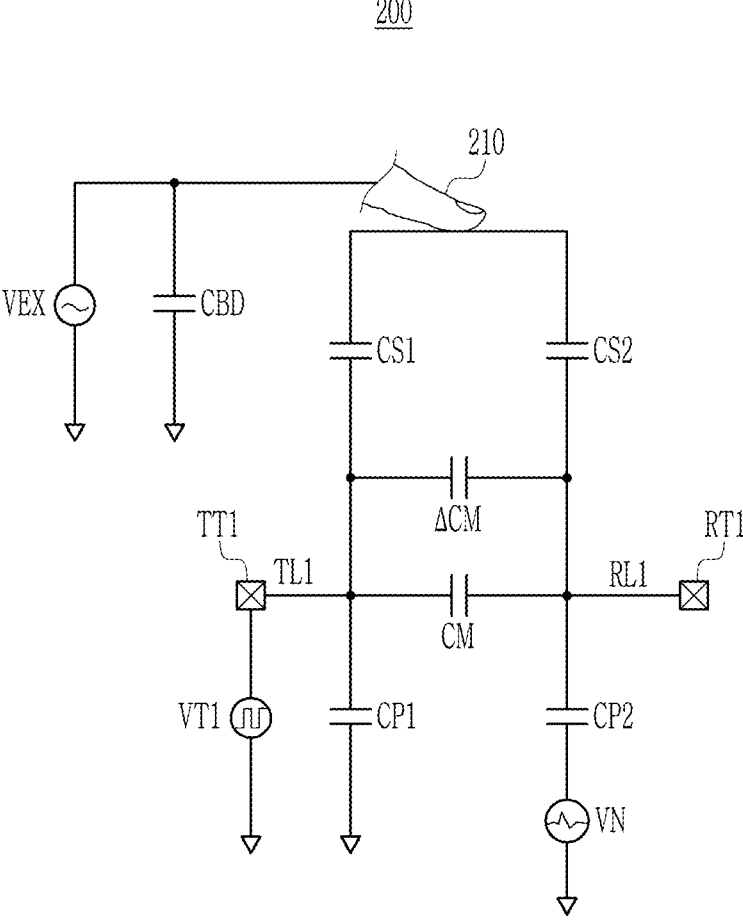
FIG. 2 shows noise giving influences to a signal caused by a touch.

In the following detailed description, only certain embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive, and like reference numerals designate like elements throughout the specification. In the flowcharts described with reference to the drawings in this specification, the operation order may be changed, various operations may be merged, certain operations may be divided, and certain operations may not be performed.

An expression recited in the singular may be construed as singular or plural unless the expression "one", "single", etc., is used. Terms including ordinal numbers such as first, second, and the like, will be used only to describe various components, and are not to be interpreted as limiting these components. The terms may only be used to differentiate one component from others.

It will be understood that, although the terms first, second, third, fourth, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

Figure 1:
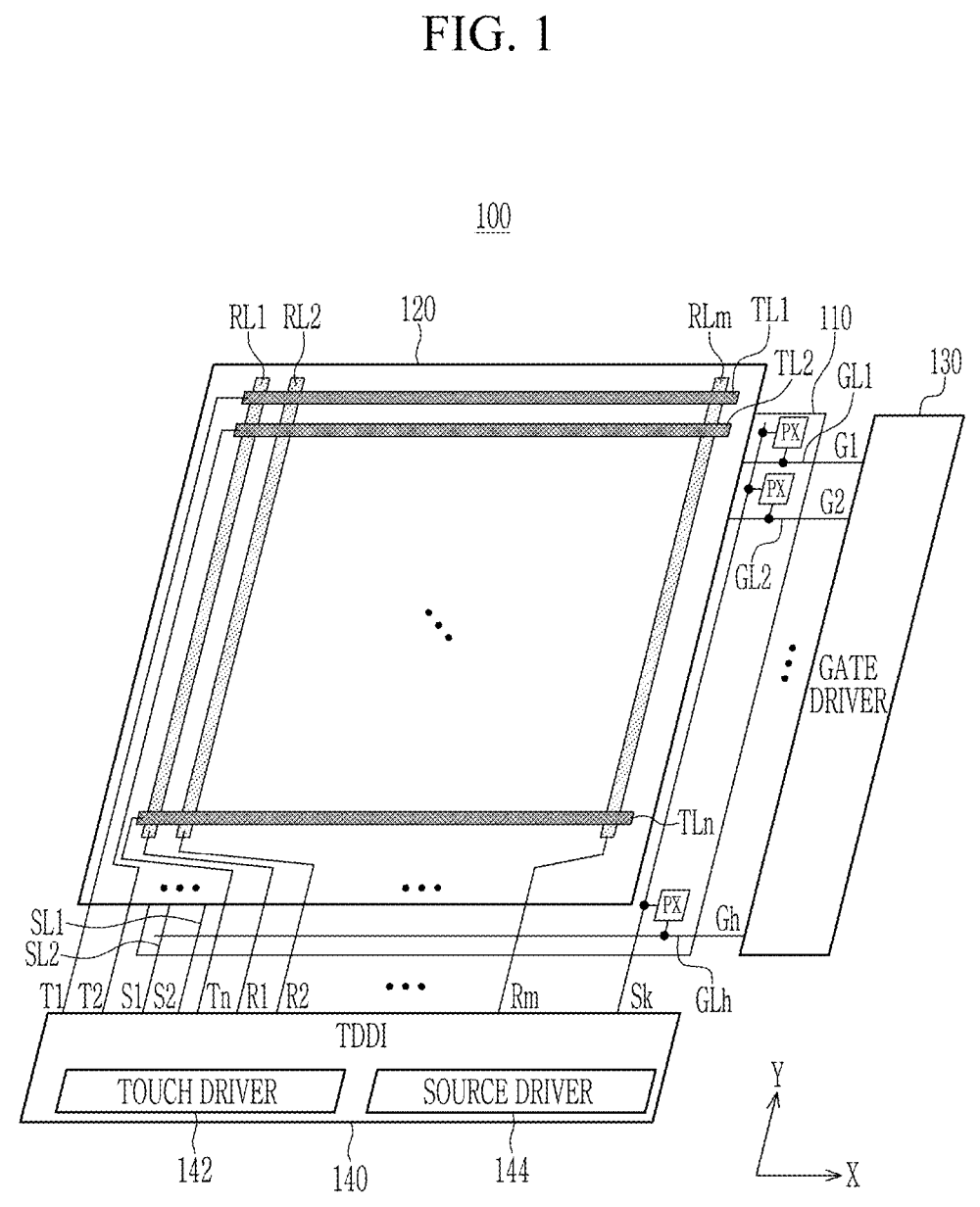

FIG. 1 shows a block diagram of a touchable display device according to one or more embodiments.

Referring to FIG. 1, the display device 100 may include a first panel 110, a second panel 120, and driving circuits 130 and 140. FIG. 1 shows that the first panel 110 and the second panel 120 are individual panels, and the electrode on the second panel 120 may be disposed on the first panel 110. The embodiments of the present disclosure are not limited to the structure of FIG. 1.

In one or more examples, pixels, PX for displaying images may be disposed in the first panel 110. Gate lines GL1, GL2, . . . , GLh and source lines SL1, SL2, . . . , SLk may be disposed in the first panel 110. The gate lines GL1, GL2, . . . . GLh may cross the source lines SL1, SL2, . . . , SLk in the first panel 110. The pixels PX may be connected to the corresponding source lines from among the source lines SL1, SL2, . . . , SLk, and the corresponding gate lines from among the gate lines GL1, GL2, . . . , GLh. The pixels PX may receive data signals from the source lines when gate signals are supplied to the gate lines. The pixels PX may express light with predetermined luminance that corresponds to input data signals. The pixels PX may display images per frame. In one or more examples, each pixel may be a sample of an original or synthetic image, where more samples provide more accurate representations of the original image. The intensity of each pixel may be variable. In color imaging systems, a color may be represented by three or four component intensities such as red, green, and blue, or cyan, magenta, yellow, and black. In one or more examples, a single pixel on a color display may be made of several subpixels.

When the display device 100 is an organic light emitting display device, the pixel PXs may respectively include transistors including driving transistors and an organic light-emitting diode. The driving transistor included in the pixel PX may supply a current that corresponds to a data signal to the organic light-emitting diode, and the organic light-emitting diode may emit light with predetermined luminance. When the display device 100 is a liquid crystal display device, the respective pixels PX may include a switching transistor and a liquid crystal capacitor. The pixels PX may control transmittance of liquid crystal in correspondence to the data signal so that predetermined luminance may be supplied an external environment (e.g., to user viewing a screen).

FIG. 1 shows that one pixel PX is connected to one source line and one gate line. However, as understood by one of ordinary skill in the art, the structure for connecting the signal lines of the pixels PX of the display device according to one or more embodiments is not limited thereto. For example, various signal lines may be additionally connected as part of the circuit structure of the pixel PX. In one or more embodiments, the pixel PX may be realized in various known forms.

The second panel 120 may be disposed on the first panel 110. The second panel 120 may include first touch electrodes RL1, RL2, . . . , RLn and second touch electrodes TL1, TL2, . . . , TLn. The first touch electrodes RL1, RL2, . . . , RLn and the second touch electrodes TL1, TL2, . . . , TLn may overlap the pixel PXs on the first panel 110 in a plan view. The first touch electrodes RL1, RL2, . . . , RLn may extend in a second direction (e.g., Y direction) and may be disposed in a first direction (e.g. X direction). The second touch electrodes TL1, TL2, . . . , TLn may extend in the first direction (e.g., X direction) and may be disposed in the second direction (e.g., Y direction) crossing the first direction. The first touch electrodes RL1, RL2, . . . , RLn and the second touch electrodes TL1, TL2, . . . , TLn may be disposed on a same plane on the second panel 120. In one or more examples, the first direction is perpendicular to the second direction.

In one or more examples, the display device 100 may function as a mutual capacitance method. In this case, the first touch electrodes RL1, RL2, . . . , RLn and the second touch electrodes TL1, TL2, . . . , TLn may form touch capacitance. Driving signals T1, T2, . . . , Tn may be sequentially applied to the second touch electrodes TL1, TL2, . . . , TLn. The driving signals applied to the second touch electrodes TL1, TL2, . . . , TLn may be transmitted to the first touch electrodes RL1, RL2, . . . , RLn through the touch capacitance. When a touch input is provided, currents and/or potentials of the first touch electrodes RL1, RL2, . . . , RLn may be changed to thus sense the touch input. In one or more examples, one or more of the driving signals may be applied in parallel. For example, signals T1 and T2 may be applied in parallel, and signals T3 and T4 may be applied in parallel after signals T1 and T2 are applied.

For another example, the display device 100 has been described to be realized according to the mutual capacitance method (e.g., electrodes defined by two conductors including both plates of the capacitor), however, the display device 100 may be operated according to a self-capacitance method (e.g., one electrode used). One or ordinary skill in the art may appropriately transform the first touch electrodes RL1, RL2, . . . , RLn, and TL1, TL2, . . . , TLn and the touch driver 142 in the mutual capacitance method, add new components, or omit one or more components to satisfy the self-capacitance method. In one or more embodiments, the display device 100 may include self-capacitance method touch electrodes. For example, the touch electrodes may be arranged in a dot form. For another example, as described above, the touch electrodes may be arranged to extend in one direction. In this case, the driving signal may be simultaneously applied to the first touch electrodes RL1, RL2, . . . , RLn, and the touch input may be sensed by the changes of the currents and/or potentials of the respective second touch electrodes TL1, TL2, . . . , TLn. The driving signal may be simultaneously applied to the respective second touch electrodes TL1, TL2, . . . , TLn, and the touch input may be sensed according the changes of the currents and/or potentials of the respective first touch electrodes RL1, RL2, . . . , RLn.

In one or more examples, the gate driver 130 may be connected to the gate lines GL1, GL2, . . . , GLh. The gate driver 130 may provide gate signals G1, G2, . . . , Gh. The gate signals G1, G2, . . . , Gh may be pulse signals having enable levels and disable levels. The gate driver 130 may generate gate signals G1, G2, . . . , Gh by a gate start pulse GSP, and may transmit the gate signals G1, G2, . . . , Gh to the gate lines GL1, GL2, . . . , GLh. When the gate signal on the enable level is applied to the gate line connected to the pixel PX, the data signal applied to the source line connected to the pixel PX may be transmitted to the pixel PX. The gate driver 130 may provide the gate signals G1, G2, . . . , Gh for horizontal periods. One frame may include horizontal periods.

FIG. 1 shows that the gate driver 130 and the first panel 110, in one or more examples, as individual semiconductor dies, chips, or modules, and the gate driver 130 may be disposed on the first panel 110. A portion of the gate driver 130 may be disposed on the first panel 110, and another portion may be included in the driving circuit 140.

The driving circuit 140 may include a touch driver 142 and a source driver 144. Portions or both of the touch driver 142 and the source driver 144 may be realized with the same semiconductor die, chip, or module, or may be realized with individual semiconductor dies, chips, or modules. In one or more embodiments, the touch driver 142 and the source driver 144 may be realized on the same substrate as the first panel 110. In this case, the touch driver 142 may be disposed around the first panel 110.

In one or more examples, the touch driver 142 may apply the driving signals T1, T2, . . . , Tn to the second touch electrodes TL1, TL2, . . . , TLn, and may receive detection signals R1, R2, . . . , Rm from the first touch electrodes RL1, RL2, RLm. The touch driver 142 may sense the changes of potentials and/or currents of the first touch electrodes RL1, RL2, . . . , RLm. The touch driver 142 may amplify the detection signals R1, R2, . . . , Rm. The touch driver 142 may convert the amplified detection signals R1, R2, . . . , Rm into touch data signals having a digital signal form.

According to one or more embodiments, the first touch electrodes RL1, RL2, . . . , RLn and the second touch electrodes TL1, TL2, . . . , TLn may overlap the pixels PX of the first panel 110 on a plane. In this case, the first touch electrodes RL1, RL2, . . . , RLn and the second touch electrodes TL1, TL2, . . . , TLn may overlap at least one of electrodes and wires installed on the first substrate 110 in a plan view. For example, when the display device 100 is an organic light emitting display device, the first touch electrodes RL1, RL2, . . . , RLn and the second touch electrodes TL1, TL2, . . . , TLn may at least overlap cathodes, data lines, and scan lines. When the display device 100 is a liquid crystal display device, the first touch electrodes RL1, RL2, . . . , RLn and the second touch electrodes TL1, TL2, . . . , TLn may at least overlap at least common electrodes, data lines, and gate lines.

As understood by one of ordinary skill in the art, parasitic capacitance may be generated between the first substrate 110 for displaying images and the second substrate 120 for sensing touch inputs. Parasitic capacitance, also known as stray capacitance, may be unavoidable capacitance that exists between the parts of an electronic component or circuit due to their proximity to one another. Due to a coupling operation resulting from the parasitic capacitance, signals of the first substrate 110 may be transmitted to the touch sensor, particularly the first touch electrodes RL1, RL2, . . . , RLn and the second touch electrodes TL1, TL2, . . . , TLn. For example, noise signals caused by display driving signals (e.g., data signals, scan signals, light emission control signals, etc.) provided to the first substrate 110 may be provided to the touch sensor.

In one or more examples, the first substrate 110 may be an organic light emitting display panel including a thin film encapsulation layer, and the first touch electrodes RL1, RL2, . . . , RLn and the second touch electrodes TL1, TL2, . . . , TLn may be configured with on-cell type sensor electrodes in which at least one touch electrode is formed on one surface (e.g., upper surface) of the thin film encapsulation layer. In this case, at least one (e.g. cathode) of the electrodes and the wires installed on the organic light emitting display panel is disposed near at least one touch electrode. Therefore, noise with a big intensity caused by driving the display may be transmitted to the first touch electrodes RL1, RL2, . . . , RLn and the second touch electrodes TL1, TL2, . . . , TLn. The noise transmitted to the first touch electrodes RL1, RL2, . . . , RLn and the second touch electrodes TL1, TL2, . . . , TLn may generate significantly disadvantageous rippling of the detection signals, thereby deteriorating sensitivity of the touch sensor.

FIG. 2 shows noise giving influences to a signal caused by a touch.

Referring to FIG. 2 together with FIG. 1, mutual capacitance CM may be formed between the second touch electrode TL1 and the first touch electrode RL1. The second touch electrode TL1 may be electrically connected to a transmitting terminal TT1 of the touch driver 142, and the first touch electrode RL1 may be electrically connected to a receiving terminal RT1 of the touch driver 142. A driving signal VT1 may be applied to the second touch electrode TL1. The second touch electrode TL1 and the first touch electrode RL1 may form parasitic capacitance CP1 and CP2 with the first substrate 110. In one or more embodiments, the first touch electrode RL1 may receive noise VN from the first substrate 110 through the parasitic capacitance CP2.

When a touch is input, a touch object 210 may form capacitive coupling CS1 and CS2 on the second touch electrode TL1 and the first touch electrode RL1, and mutual capacitance variation (ACM) may be generated between the second touch electrode TL1 and the first touch electrode RL1 by the touch object 210. The touch object 210 and a ground may form capacitive coupling CBD through a human body. External noise VEX may be transmitted to the second touch electrode TL1 and the first touch electrode RL1 through the touch object 210.

To offset the noise, the touch driver 142 may generate touch data signals based on a difference (e.g., a differential touch profile) of two first currents (or voltages) received from two first touch electrodes in one pair (e.g., see Equation 1). For example, influences of the noise VN and the external noise VEX may be offset by calculating the difference between the two first currents including the noise VN and the external noise VEX in common.

$$
\begin{pmatrix}
1 & -1 & 0 & 0 \\
0 & 1 & -1 & 0 \\
0 & 0 & 1 & -1 \\
-1 & 0 & 0 & 1
\end{pmatrix}
\times
\begin{pmatrix}
ISIG1 \\
ISIG2 \\
ISIG3 \\
ISIG4
\end{pmatrix}
+
\begin{pmatrix}
INS1 \\
INS2 \\
INS3 \\
INS4
\end{pmatrix}
=
\qquad \text{(Equation 1)}
$$

-continued $$\begin{pmatrix} ISIG1 - ISIG2 + INS1 \\ ISIG2 - ISIG3 + INS2 \\ ISIG3 - ISIG4 + INS3 \\ ISIG4 - ISIG1 + INS4 \end{pmatrix}$$

In one or more examples, ISIG1 to ISIG4 are first currents from four first touch electrodes, and INS1 to INS4 are noise in the touch driver 142 connected to four first touch electrodes.

According to the method for generating a differential touch profile, when a touch is input to one first touch electrode and a first current caused by the touch input is generated, changes of currents occurring in the two first touch electrodes based on the difference between the first current from another first touch electrode, may be detected, making the pair and the first current caused by the touch input. Therefore, a differential to single profile conversion may be performed on the differential touch profile to convert the differential touch profile to a single profile. However, by performing this conversion according to Equation 2, noise in the touch driver 142 is added to the signal resulting in a low SNR, which is a problem.

$$\begin{pmatrix} 1 & 1 & 1 & 1 \\ 0 & 1 & 1 & 1 \\ 0 & 0 & 1 & 1 \\ 0 & 0 & 0 & 1 \end{pmatrix} \times \begin{pmatrix} ISIG1 - ISIG2 + INS1 \\ ISIG2 - ISIG3 + INS2 \\ ISIG3 - ISIG4 + INS3 \\ ISIG4 - ISIG1 + INS4 \end{pmatrix} = \qquad \text{(Equation 2)}$$

$$\begin{pmatrix} INS1 + INS2 + INS3 + INS4 \\ ISIG2 - ISIG1 + INS2 + INS3 + INS4 \\ ISIG3 - ISIG1 + INS3 + INS4 \\ ISIG4 - ISIG1 + INS4 \end{pmatrix}$$

In one or more embodiments, the touch driver 142 may receive the first currents flowing to the first touch electrodes RL1, RL2, . . . , RLm as the detection signals R1, R2, . . . , Rm. The touch driver 142 may generate a touch data signal based on a difference between a mean current of the first currents and the first current flowing to the first touch electrodes RL1, RL2, . . . , RLm. For example, the touch driver 142 may receive the first currents from the first touch electrodes RL1, RL2, . . . , RLm, may generate second currents that have an opposite direction to the sensing currents, and may generate a touch data signal based on the mean current of the second currents and the sum of the first currents. In one or more embodiments, the touch driver 142 may include an m:1 current mirror. The current mirror may include a first transistor with a first size to which a common current that is the sum of the second currents flows, and second transistors to which a mean current obtained by duplicating the current flowing to the first transistor by 1/m power flows. In one or more examples, m is a positive integer and may be the number of the first touch electrodes RL1, RL2, . . . , RLm, and is not limited thereto. In one or more embodiments, the touch driver 142 may be connected to j-numbered (e.g., j is a positive integer satisfying j<m) first touch electrodes from among the first touch electrodes RL1, RL2, . . . , RLm. The touch driver 142 may receive the first currents from the j-numbered first touch electrodes. In this case, the touch driver 142 may include a j:1 current mirror. The current mirror may include a first transistor with a first size to which the common current which is the sum of the second currents flows and second transistors to which the mean current obtained by duplicating the current flowing to the first transistor by 1/j power flows. The touch driver 142 may add the mean current to the respective first currents, and may generate a touch data signal based on the added currents.

According to one or more embodiments, the touch driver 142 subtracts the mean current of the first currents from the respective first currents, and generates touch data based on the subtracted currents. Therefore, based on the embodiments of the present disclosure, the differential to single profile conversion is not used, thereby resulting in the advantageous prevention of noise accumulating on the signal. Therefore, the touch driver 142 may generate the touch data signal with a relatively high SNR.

The source driver 144 may generate data signals S1, S2, . . . , Sk in an analog signal form. The source driver 144 may transmit the data signals S1, S2, . . . , Sk to the first panel 110. The source driver 144 may include an amplifying region. The amplifying region may transmit corresponding ones of the data signals S1, S2, Sk to the source lines SL1, SL2, . . . , SLh. The source driver 144 may be referred to as a data driver.

The driving circuit 140 may receive image data and a driving control signal from the host device, and may control the gate driver 130, the touch driver 142, and the source driver 144. In one or more examples, the host device may be a computing device or a system for controlling the display device 100 so that a user from the outside may display desired images to the first panel 110. The driving control signal provided by the host device may include control instructions for controlling the gate driver 130, the touch driver 142, and the source driver 144, and setting data.

Figure 3:
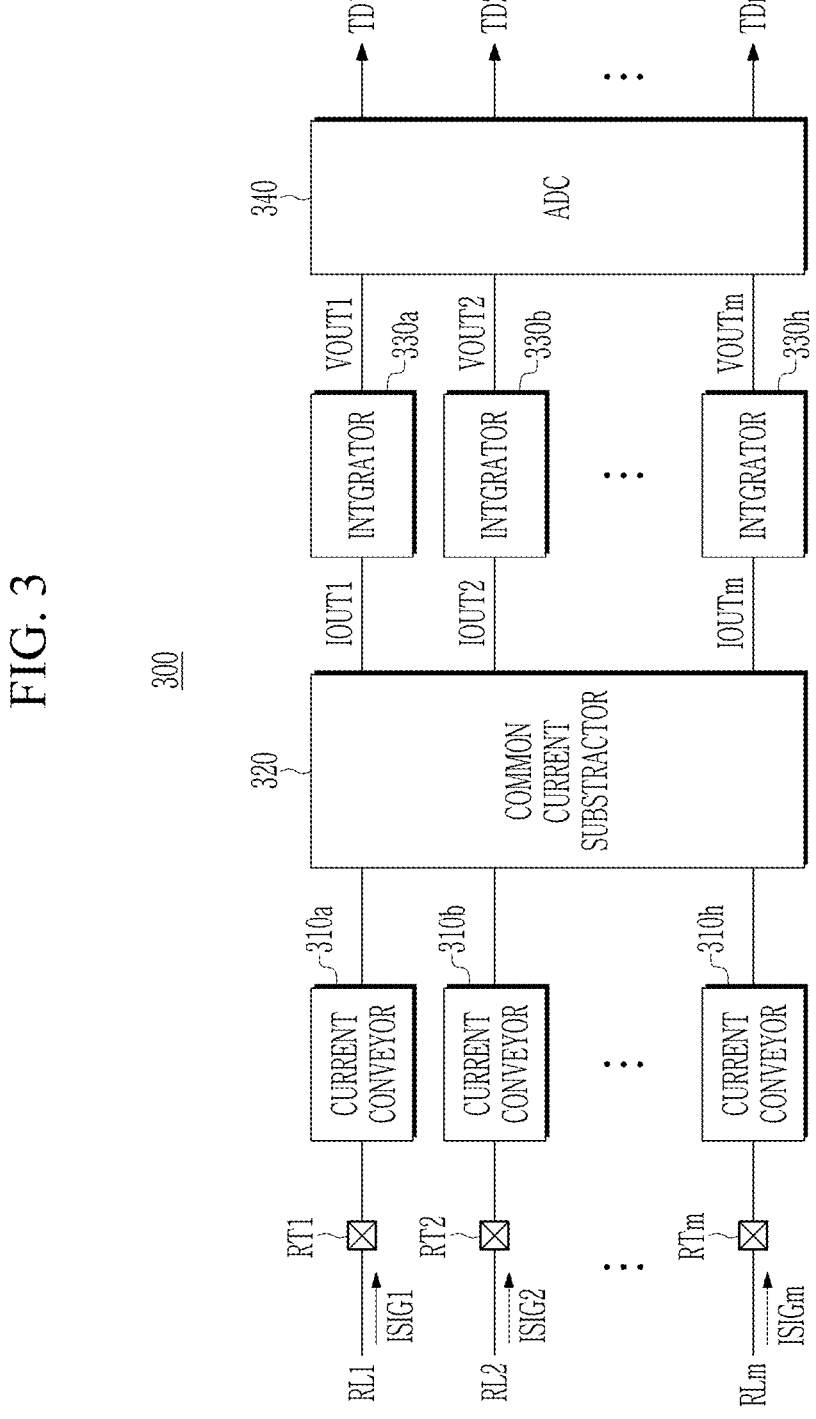
FIG. 3 shows a block diagram on a touch driver according to one or more embodiments.

FIG. 3 shows a block diagram on a touch driver according to one or more embodiments.

Referring to FIG. 3, the touch driver 300 may be connected to receiving terminals RT1, RT2, . . . , RTm, and may generate touch data signals TD1, TD2, TDm based on first currents ISIG1, ISIG2, . . . , ISIGm received from the receiving terminals RT1, RT2, . . . , RTm and touch voltages. The receiving terminals RT1, RT2, . . . , RTm may be connected to the first touch electrodes RL1, RL2, . . . , RLm, respectively. The number of the receiving terminals RT1, RT2, . . . , RTm may be different from the number of the first touch electrodes RL1, RL2, . . . , RLm. For example, the number of the receiving terminals RT1, RT2, . . . , RTm may be j, and the number of the first touch electrodes RL1, RL2, . . . , RLm may be m (e.g., m is a positive integer satisfying m>j). The j-numbered first touch electrodes from among the first touch electrodes RL1, RL2, . . . , RLm may be connected to the j-numbered receiving terminals RT1, RT2, . . . , RTm. The touch driver 300 may receive the first currents from the j-numbered receiving terminals.

The touch driver 300 may include current conveyors 310a, 310b, . . . , 310h, a common current subtractor 320, integrators 330a, 330b, . . . , 330h, and an analog-digital converter (ADC) 340.

In one or more examples, the current conveyors 310a, 310b, . . . , 310h may be connected to the receiving terminals RT1, RT2, . . . , RTm. The current conveyors 310a, 310b, . . . , 310h may receive the first currents ISIG1, ISIG2, . . . , ISIGm from the first touch electrodes RL1, RL2, . . . , RLm. The current conveyors 310a, 310b, . . . , 310h may include first current mirrors for mirroring the first currents ISIG1, ISIG2, . . . , ISIGm and second current mirrors. The first current mirrors may generate first mirroring currents in the same direction as the first currents ISIG1, ISIG2, . . . , ISIGm, and the second current mirrors may generate second mirroring currents in the opposite direction to the first currents ISIG1, ISIG2, . . . , ISIGm. The current conveyors 310a, 310b, . . . , 310h may output the first mirroring currents and the second mirroring currents to the common current subtractor 320.

In one or more examples, the common current subtractor 320 may receive the first mirroring currents and the second mirroring currents, and may discharge output currents IOUT1, IOUT2, . . . , IOUTm that are the addition (e.g., sum) of the mean current of the second mirroring currents and the respective first mirroring currents. The common current subtractor 320 may discharge the output currents IOUT1, IOUT2, . . . , IOUTm to the integrators 330a, 330b, . . . , 330h.

The integrators 330a, 330b, . . . , 330h may integrate the respective output currents IOUT1, IOUT2, . . . , IOUTm, and may discharge output voltages VOUT1, VOUT2, . . . , VOUTm. The integrators 330a, 330b, . . . 330h may include operational amplifiers and feedback capacitors.

In one or more examples, the analog-digital converter 340 may convert the output voltages VOUT1, VOUT2, . . . , VOUTm into touch data signals TD1, TD2, . . . , TDm in a digital signal form.

FIG. 3 shows that the touch driver 300 is connected to the receiving terminals RT1, RT2, . . . , RTm connected to the first touch electrodes RL1, RL2, . . . , RLm, and the touch driver 300 may be connected to the second touch electrodes TL1, TL2, . . . , TLn through transmitting terminals. For example, the touch driver 300 may receive the first currents from the second touch electrodes TL1, TL2, . . . , TLn as detection signal, and is not limited to the above description.

Figure 4:
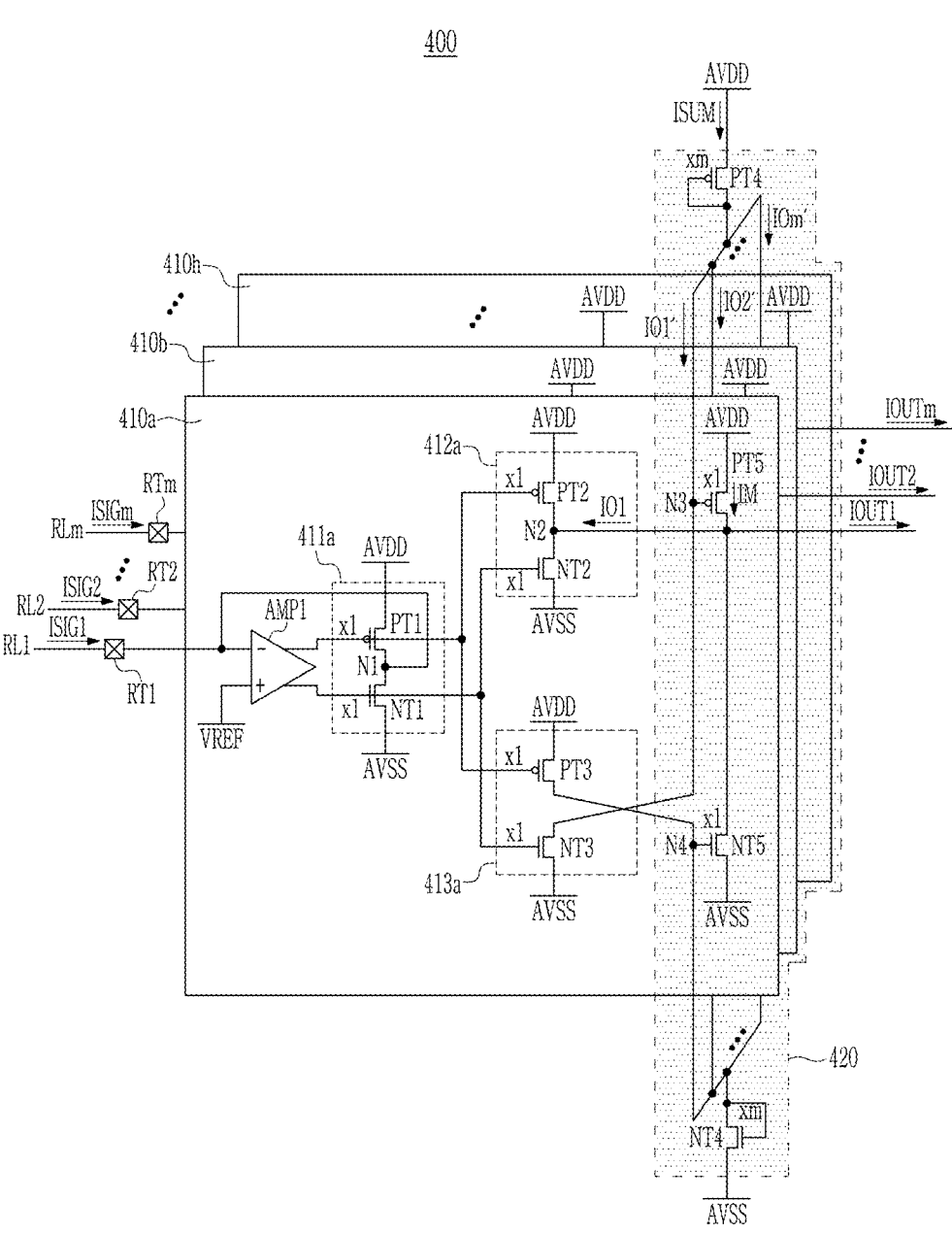
FIG. 4 shows a circuit diagram on a touch driver according to one or more embodiments.

FIG. 4 shows a circuit diagram on a touch driver according to one or more embodiments.

Referring to FIG. 4, the touch driver 400 may be connected to the receiving terminals RT1, RT2, . . . , RTm, may receive the first currents ISIG1, ISIG2, ISIGm from the receiving terminals RT1, RT2, . . . , RTm, respectively, may add a mean current IM to the first currents ISIG1, ISIG2, . . . , ISIGm, and may output currents IOUT1, IOUT2, . . . , IOUTm. The touch driver 400 may include current conveyors 410a, 410b, . . . , 410h and a common current subtractor 420.

In one or more examples, the current conveyors 410a, 410b, . . . , 410h may include an amplifier AMP1 connected to the receiving terminals RT1, RT2, . . . , RTm, a current buffer 411a connected to an output terminal of the amplifier AMP1, a first current mirror 412a for generating a first mirroring current IO1 having the same direction as the current flowing to the current buffer, and a second current mirror 413a for generating a second mirroring current IO1' having the opposite direction to the current flowing to the current buffer.

In one or more examples, the amplifier AMP1 may include an inverting input terminal connected to the receiving terminal RT1, a non-inverting input terminal for receiving a reference voltage VREF, and first and second output terminals for outputting signals caused by the voltages applied to the inverting input terminal and the non-inverting input terminal. When the voltage applied to the inverting input terminal is greater than the voltage applied to the non-inverting input terminal, the first output terminal may output a low level voltage, and the second output terminal may output a high level voltage. When the voltage applied to the non-inverting input terminal is greater than the voltage applied to the inverting input terminal, the first output terminal may output a high level voltage, and the second output terminal may output a low level voltage.

In one or more examples, the current buffer 411a may be controlled by the signals output by the first and second output terminals of the amplifier AMP1, and may buffer the current. The current buffer 411a may include a first P-type transistor PT1 and a first N-type transistor NT1 connected in a CMOS form between a first driving voltage AVDD and a second driving voltage AVSS. A gate of the first P-type transistor PT1 may be connected to a first output terminal of the amplifier AMP1, and a gate of the first N-type transistor NT1 may be connected to a second output terminal of the amplifier AMP1. A first node N1 between the first P-type transistor PT1 and the first N-type transistor NT1 may be connected to the inverting input terminal of the amplifier AMP1. A drain of the first P-type transistor PT1 and a drain of the first N-type transistor NT1 may be connected to the receiving terminal RT1.

In one or more examples, the first current mirror 412a may be controlled by the signal output by the first and second output terminals of the amplifier AMP1, and may generate the first mirroring current IO1 having the same direction as the current flowing to the current buffer 411a. The first current mirror 412a may include a second P-type transistor PT2 and a second N-type transistor NT2 connected in a CMOS form between the first driving voltage AVDD and the second driving voltage AVSS. A gate of the second P-type transistor PT2 may be connected to the first output terminal of the amplifier AMP1, and a gate of the second N-type transistor NT2 may be connected to the second output terminal of the amplifier AMP1. For example, when a potential of the first touch electrode RL1 is lower than the reference voltage VREF, the second N-type transistor NT2 may be turned on, and the first mirroring current IO1 may sink to the turned-on second N-type transistor NT2 through a second node N2. When the potential of the first touch electrode RL1 is higher than the reference voltage VREF, the second P-type transistor PT2 may be turned on, and the first mirroring current IO1 may be sourced to the second node N2 through the turned-on second P-type transistor PT2.

In one or more examples, the second current mirror 413a may be controlled by the signals output by the first and second output terminals of the amplifier AMP1, and may generate a second mirroring current IO1' having the opposite direction to the current flowing to the current buffer 411a. The second current mirror 413a may include a third P-type transistor PT3 connected between the first driving voltage AVDD and a fourth node N4 and a third N-type transistor NT3 connected between a third node N3 and the second driving voltage AVSS. A gate of the third P-type transistor PT3 may be connected to the first output terminal of the amplifier AMP1, and a gate of the third N-type transistor NT3 may be connected to the second output terminal of the amplifier AMP1. For example, when the potential of the first touch electrode RL1 is lower than the reference voltage VREF, the third N-type transistor NT3 may be turned on, and the second mirroring current IO1' may sink to the turned-on third N-type transistor NT3 through a third node N3. When the potential of the first touch electrode RL1 is higher than the reference voltage VREF, the third P-type transistor PT3 may be turn on, and the second mirroring current IO1' may be sourced to the fourth node N4 through the turned-on third P-type transistor PT3.

In one or more examples, the common current subtractor 420 may sink to the current conveyors 410a, 410b, . . . , 410h or may add the second mirroring currents IO1', IO2', . . . , IOm' sourced from the current conveyors 410a, 410b, . . . , 410h, and may provide the mean current IM of the added currents ISUM to the second node N2. In one or more embodiments, the common current subtractor 420 may include a fourth P-type transistor PT4 for sourcing the second mirroring currents IO1', IO2', . . . , IOm' to the current conveyors 410*a*, 410*b*, . . . , 410*h*, a fourth N-type transistor NT4 for sinking the second mirroring currents IO1', IO2', . . . , IOm' from the current conveyors 410*a*, 410*b*, . . . , 410*h*, fifth P-type transistors PT5 for duplicating a current flowing to the fourth P-type transistor PT4 by m:1, and fifth N-type transistors NT5 for duplicating a current flowing to the fourth N-type transistor NT4 by m:1, where m is an integer greater than zero.

The fourth P-type transistor PT4 may be connected between the first driving voltage AVDD and the third node N3 of the current conveyors 410*a*, 410*b*, . . . , 410*h*. The fourth P-type transistor PT4 may be m times the size of the fifth P-type transistor PT5. A source of the fourth P-type transistor PT4 may be connected to the first driving voltage AVDD, and a gate and a drain may be connected to the third node N3. For example, the fourth P-type transistor PT4 may be diode-connected between the first driving voltage AVDD and the third node N3 of the current conveyors 410*a*, 410*b*, . . . , 410*h*. When the potential of the first touch electrode RL1 is lower than the reference voltage VREF, the current ISUM that is the sum of the second mirroring currents IO1', IO2', . . . , IOm' may flow through the fourth P-type transistor PT4.

In one or more examples, the respective fifth P-type transistors PT5 may be connected between the first driving voltage AVDD and the second node N2 of the corresponding one of the current conveyors 410*a*, 410*b*, . . . , 410*h*. The respective gates of the fifth P-type transistors PT5 may be connected to the third node N3 of the corresponding one of the current conveyors 410*a*, 410*b*, . . . , 410*h*. The fourth P-type transistor PT4 and the fifth P-type transistors PT5 may respectively form a current mirror. The mean current IM generated by duplicating the current ISUM by 1:m flowing through the fourth P-type transistor PT4 may flow to the respective fifth P-type transistors PT5.

Therefore, the output current IOUT that is the addition of the first mirroring current IO1 sinking to the second N-type transistor NT2 from the second node N2 and the mean current IM sourced to the second node N2 may be output from the second node N2.

In one or more examples, the fourth N-type transistor NT4 may be connected between the second driving voltage AVSS and the fourth node N4 of the current conveyors 410*a*, 410*b*, . . . , 410*h*. The size of the fourth N-type transistor NT4 may be m times the size of the fifth N-type transistor NT5. The source of the fourth N-type transistor NT4 may be connected to the second driving voltage AVSS, and the gate and the drain may be connected to the fourth node N4. For example, the fourth N-type transistor NT4 may be diode-connected between the second driving voltage AVSS and the fourth node N4 of the current conveyors 410*a*, 410*b*, . . . , 410*h*. When the potential of the first touch electrode RL1 is higher than the reference voltage VREF, the current ISUM that is the sum of the second mirroring currents IO1', IO2', . . . , IOm' may flow through the fourth N-type transistor NT4.

In one or more examples, the respective fifth N-type transistors NT5 may be connected between the first driving voltage AVDD and the second node N2 of the corresponding one of the current conveyors 410*a*, 410*b*, . . . , 410*h*. The respective gates of the fifth N-type transistors NT5 may be connected to the third node N3 of the corresponding one of the current conveyors 410*a*, 410*b*, . . . , 410*h*. The fourth N-type transistor NT4 and the fifth N-type transistors NT5 may respectively form a current mirror. The mean current IM generated by duplicating the current ISUM flowing through the fourth N-type transistor NT4 by 1:m may flow to the respective fifth N-type transistors NT5.

Therefore, the output current IOUT that is the addition (e.g., sme) of the first mirroring current IO1 sourced to the second N-type transistor NT2 from the second node N2 and the mean current IM sinking to the second node N2 may be output from the second node N2.

Referring to FIG. 4, as marked with 'x1' and 'xm', the sizes of the second, third, and fifth P-type transistors PT2, PT3, and PT5 and the size of the fourth P-type transistor PT4 may be 1:m. In one or more examples, the sizes of the second, third, and fifth N-type transistors NT2, NT3, and NT5 and the size of the fourth N-type transistor NT4 may be 1:m. The size of the first P-type transistor PT1 may be substantially equal to the sizes of the second, third, and fifth P-type transistors PT2, PT3, and PT5, and the size of the first N-type transistor NT1 may be substantially equal to the sizes of the second, third, and fifth N-type transistors NT2, NT3, and NT5. However, according to several embodiments, the sizes of the first to fifth P-type transistors PT1, . . . , PT5 and the sizes of the first to fifth N-type transistors NT1, . . . , NT5 are not limited to the example of FIG. 4.

Figure 5:
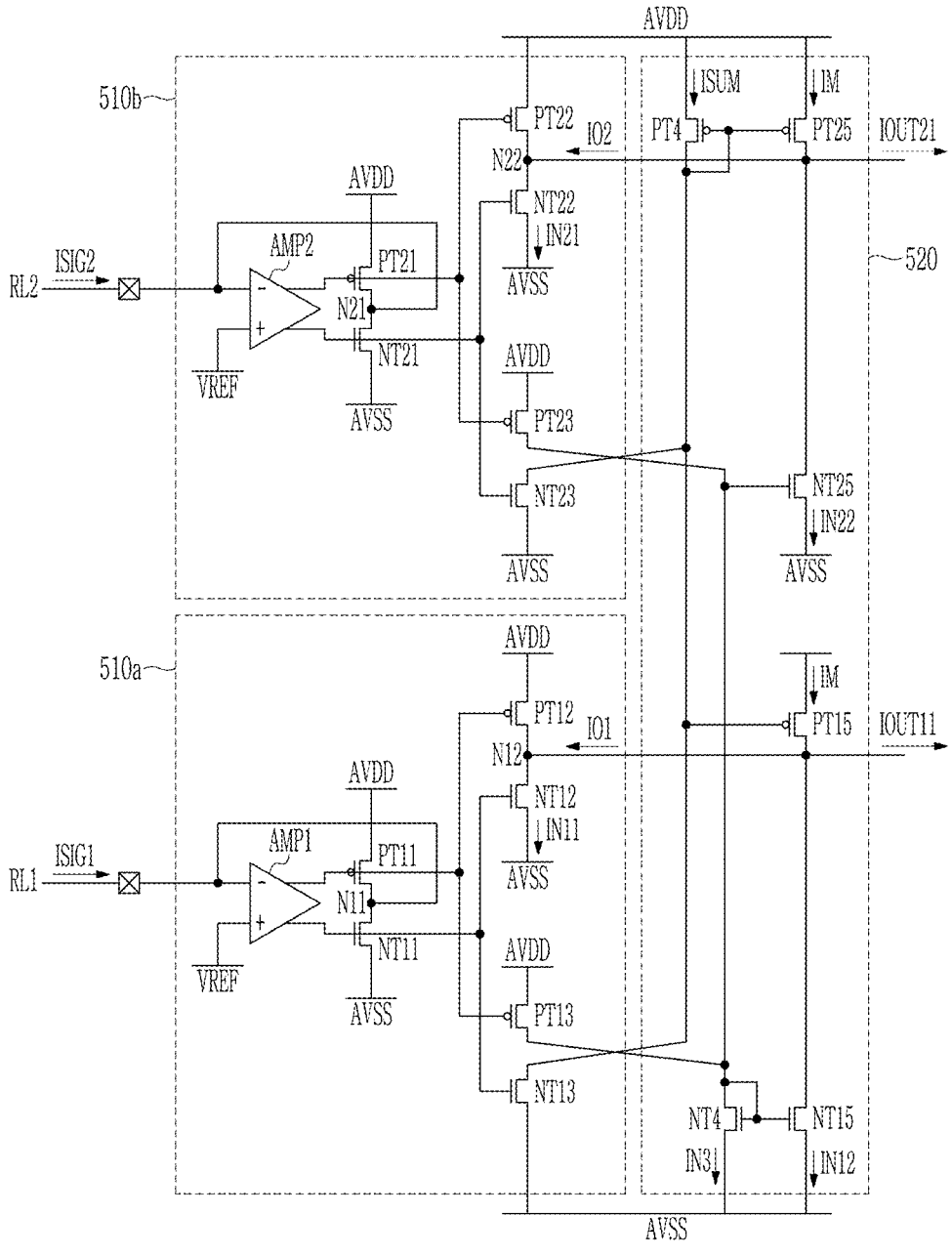
FIG. 5 shows a circuit diagram on a portion of a touch driver according to one or more embodiments.

FIG. 5 shows a circuit diagram on a portion of a touch driver according to one or more embodiments.

Referring to FIG. 5, circuit random noises (e.g., circuit generated noises) IN11, IN21, IN12, IN22, and IN3 such as heat noise and flicker noise may be generated in the touch driver 142. As understood by one of ordinary skill in the art, heat noise may occur due to a vibration of charge carriers within an electrical conductor and may be directly proportional to the temperature, regardless of an applied voltage. As understood by one of ordinary skill in the art, flicker noise may be caused by charge carriers that are trapped and released between interfaces of two materials. Regarding the noises IN11, IN21, IN12, IN22, and IN3, FIG. 5 exemplifies that current conveyors 510*a* and 510*b* are connected to two first touch electrodes RL1 and RL2, and a common current subtractor 520.

In one or more examples, the transistors included in the respective current conveyors 510*a* and 510*b* may generate noises IN11, IN21, IN12, IN22, and IN3 caused by heat and flickers. The noises IN11, IN21, IN12, IN22, and IN3 generated by the transistors may be different from each other according to process deviations, temperatures, and voltages of the transistors. The noises generated by the transistors corresponding to each other in the current conveyors 510*a* and 510*b* may be different from each other. For example, the noise IN11 generated by the transistors PT12 and NT12 included in the first current mirror of the current conveyor 510*a* may be different from the noise IN21 generated by the transistors PT22 and NT22 included in the first current mirror of the current conveyor 510*b*. Therefore, the noises IN11 and IN12 giving influences to the output current IOUT1 are different from the noises IN21 and IN22 giving influences to the output current IOUT2, thereby increasing random noise. In the case of conventional differential touch profile types, the respective current conveyors 510*a* and 510*b* may include differential transistors for differentiating the currents IO1 and IO2 generated by other current conveyors. The noise generated by the differential transistors of the current conveyor 510*a* is different from the noise generated by the differential transistors of the current conveyor 510*b* so random noise may be further increased by the differential transistors. However, according to one or more embodiments of the present disclosure, the current conveyors 510a and 510b include no differential transistors, and the noise IN3 gives substantially the same influences to the output current IOUT1 and the output current IOUT2, thereby reducing the random noise.

Figure 6:
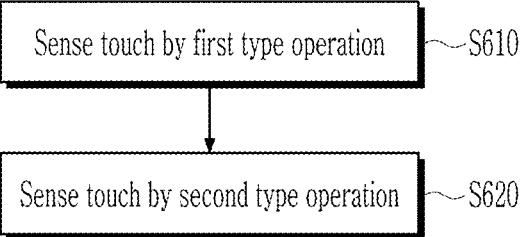
FIG. 6 shows a flowchart on a method for operating a touch device according to one or more embodiments.

FIG. 6 shows a flowchart on a method for operating a touch device according to one or more embodiments. In one or more examples, the operations of the method of FIG. 6 may be performed using the embodiments of FIG. 1.

Referring to FIG. 1 and FIG. 6, the touch driver 142 may sense touch inputs by different type operations.

The touch driver 142 senses a touch by a first type operation (S610).

The touch driver 142 senses a touch by a second type operation (S620).

The first type operation and the second type operation may include a mutual capacitance method operation and/or a self-capacitance method operation. When the first type operation is the mutual capacitance method operation, the second type operation may be the self-capacitance method operation, and when the first type operation is the self-capacitance method operation, the second type operation may be the mutual capacitance method operation. In one or more embodiments, the touch driver 142 may perform the stages S610 and S620 in one frame period.

Figure 7:
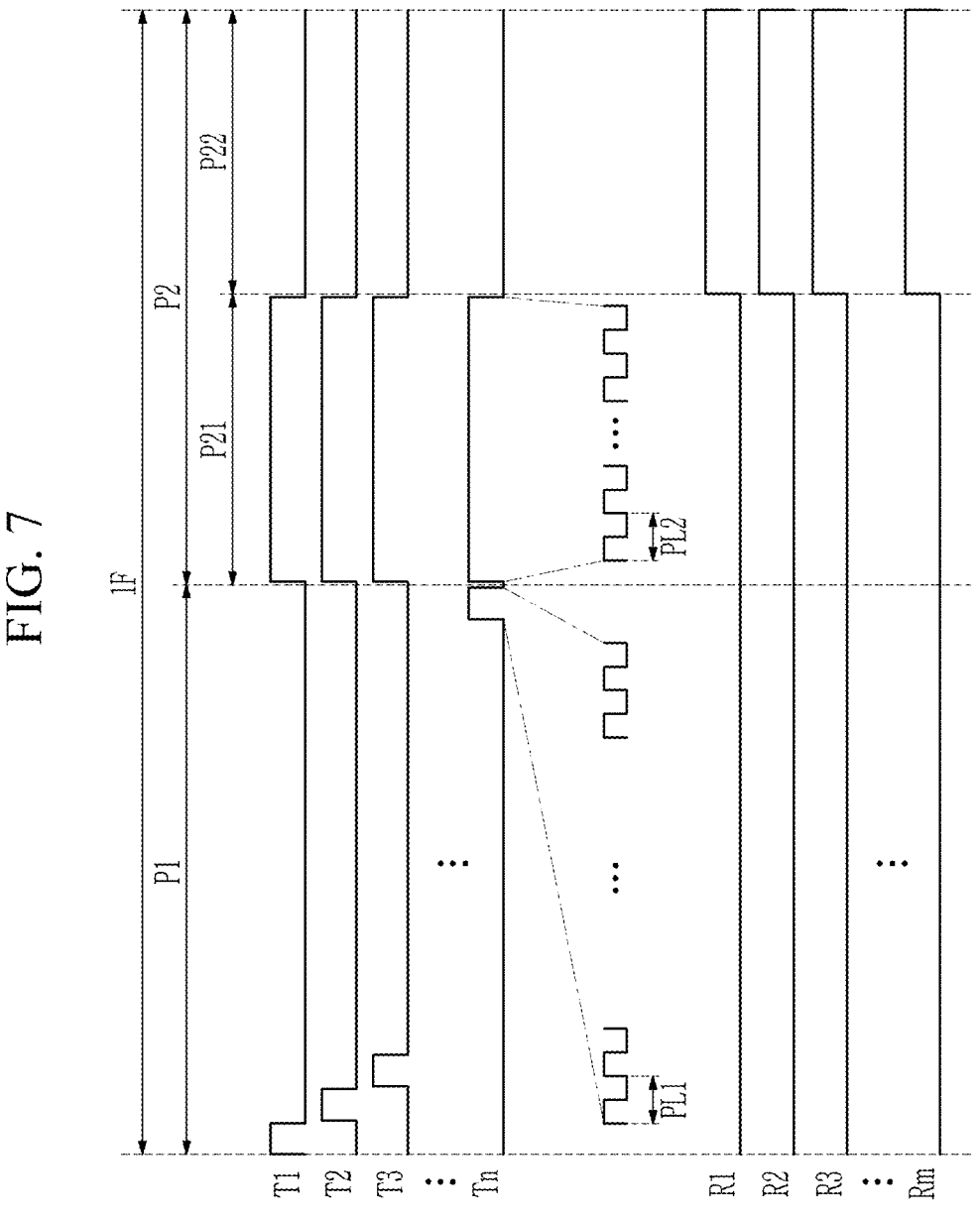
FIG. 7 shows a timing diagram on a method for operating a touch device according to one or more embodiments.

FIG. 7 shows a timing diagram on a method for operating a touch device according to one or more embodiments.

Referring to FIG. 1, FIG. 6, and FIG. 7, the touch driver 142 may perform the stage S610 for a first period P1 of the one frame 1F period. In one or more embodiments, the touch driver 142 may be operated according to the mutual capacitance method for the first period P1. For example, the touch driver 142 may sequentially apply the driving signals T1, T2, . . . , Tn to the second touch electrodes TL1, TL2, . . . , TLn, respectively. The respective driving signals T1, T2, . . . , Tn may be a pulse signal of the first period PL1. The touch driver 142 may receive detection signals R1, R2, . . . , Rm from the first touch electrodes RL1, RL2, . . . , RLn, respectively. The touch driver 140 may receive the detection signals R1, R2, . . . , Rm for the first period P1, and may generate touch data by respectively subtracting the mean of the detection signals R1, R2, . . . , Rm and the detection signals R1, R2, . . . , Rm.

The touch driver 142 may perform the stage S620 for a second period P2 in the one frame 1F period. In one or more embodiments, the touch driver 142 may be operated according to the self-capacitance method for the second period P2. The touch driver 142 may simultaneously apply the driving signals T1, T2, . . . , Tn to the second touch electrodes TL1, TL2, . . . , TLn for a twenty-first period P21 in the second period P2. The respective driving signals T1, T2, . . . , Tn may be a pulse signal of the second period PL2. In one or more embodiments, the first period PL1 may be shorter than the second period PL2. For example, frequencies of the driving signals T1, T2, . . . , Tn for the first period P1 may be higher than frequencies of the driving signals T1, T2, . . . , Tn for the second period P2. The touch driver 142 may receive the detection signals R1, R2, . . . , Rm from the first touch electrodes RL1, RL2, . . . , RLn. The touch driver 140 may receive the detection signals R1, R2, . . . , Rm for the twenty-first period P21, and may generate touch data by respectively subtracting the mean of the detection signals R1, R2, . . . , Rm and the detection signals R1, R2, . . . , Rm. By performing this operation, positions of the first touch electrodes RL1, RL2, . . . , RLn having touch inputs may be determined. The touch driver 142 may simultaneously apply the driving signals R1, R2, . . . , Rm to the first touch electrodes RL1, RL2, . . . , RLm for a twenty-second period P22 in the second period P2. The respective driving signals R1, R2, . . . , Rm may be a pulse signal with a predetermined period PL2. The touch driver 142 may receive the detection signals T1, T2, . . . , Tn from the second touch electrodes TL1, TL2, . . . , TLn. The touch driver 140 may receive the detection signals T1, T2, . . . , Tn for the twenty-second period P22, and may generate touch data by respectively subtracting the mean of the detection signals T1, T2, . . . , Tn and the detection signals T1, T2, . . . , Tn. By performing this operation, positions of the second touch electrodes TL1, TL2, . . . , TLn having touch inputs may be determined.

The touch driver 142 may perform the first type operation and the second type operation in one frame period to sense multi-touch input and provider further robustness against noise.

Figure 8:
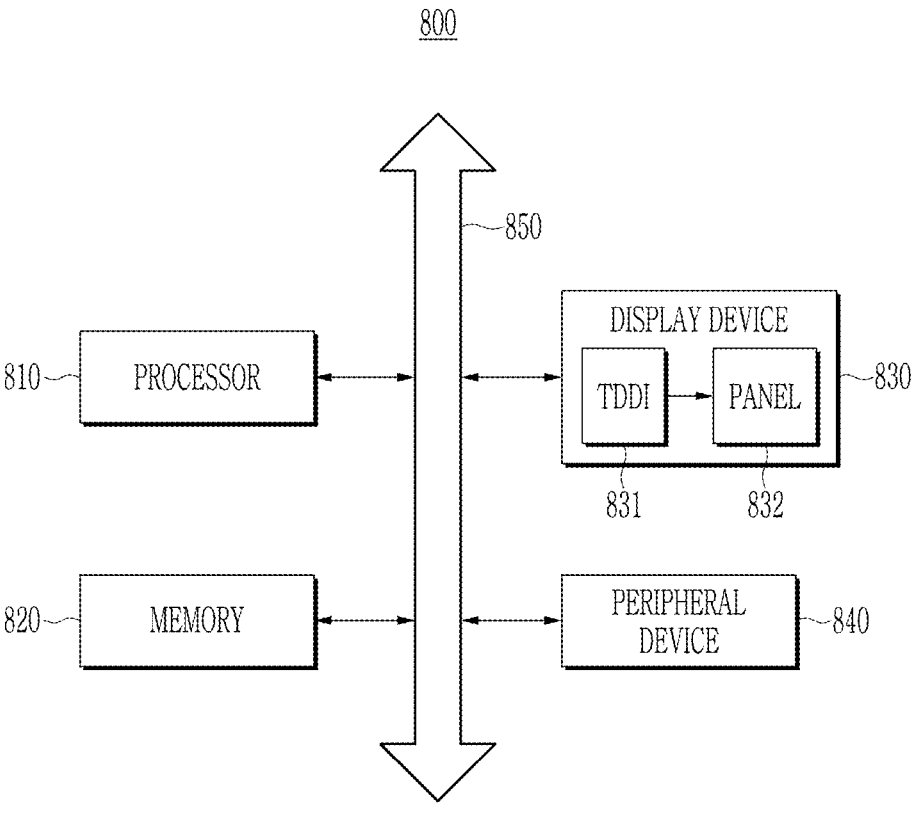
FIG. 8 shows a semiconductor system according to one or more embodiments.

FIG. 8 shows a semiconductor system according to one or more embodiments.

Referring to FIG. 8, the semiconductor system 800 may include a processor 810, a memory 820, a display device 830, and a peripheral device 840 electrically connected to a system bus 850.

The processor 810 may control data inputs/outputs of the memory 820, the display device 830, and the peripheral device 840, and may image-process image data that are transmitted between the corresponding devices.

The memory 820 may include a volatile memory such as a dynamic random access memory (DRAM) and/or a non-volatile memory such as a flash memory. The memory 820 may include a DRAM, a phase-change random access memory (PRAM), a magnetic random access memory (MRAM), a resistive random access memory (ReRAM), a ferroelectric random access memory (FRAM), a NOR flash memory, a NAND flash memory, and a fusion flash memory (e.g., a memory that is a combination of a static random access memory (SRAM) buffer, a NAND flash memory, and a NOR interface logic). The memory 820 may store the image data obtained from the peripheral device 840 or may store the video signals processed by the processor 810.

The display device 830 may include a TDDI 831 and a panel 832, and may store the image data applied through the system bus 850 into a frame memory included in the TDDI 831 and may then display the same to the panel 832. The TDDI 831 may be a touch driver according to one or more embodiments. The TDDI 831 may receive currents from the touch electrodes, may add the mean current of the currents in the opposite direction to the received currents to the received currents to generate output currents, and may generate touch data based on the generated output currents.

The peripheral device 840 may convert videos or still images generated by a camera, a scanner, or a webcam into electrical signals. The image data obtained through the peripheral device 840 may be stored in the memory 820 or may be displayed in real time to the panel 832.

The semiconductor system 800 may be installed in mobile electronic products such as smartphones, and without being limited thereto, it may be installed in various types of electronic products for displaying images such as tablets, computers, display panels on appliances, televisions, etc.

Figure 9:
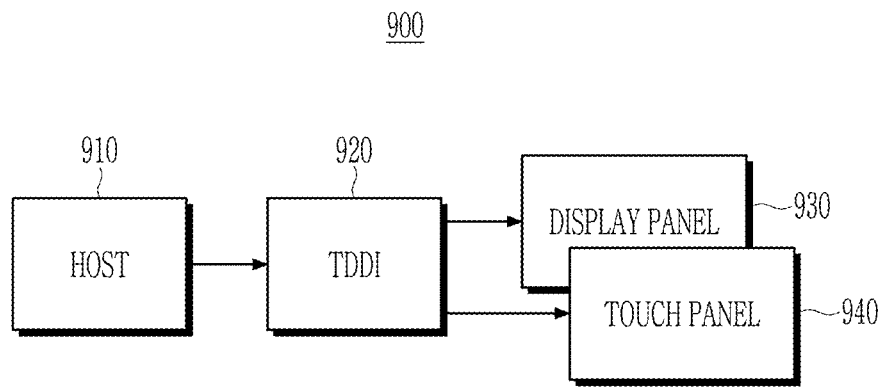
FIG. 9 shows a semiconductor system according to one or more embodiments.

FIG. 9 shows a semiconductor system according to one or more embodiments.

Referring to FIG. 9, the semiconductor system 900 may include a host 910, a TDDI 920, a display panel 930, and a touch panel 940.

The host 910 may receive data or instructions from the user, and may control the TDDI 920 based on the received data or instructions. The TDDI 920 may drive the display panel 930 and the touch panel 940 according to control by the host 910. The TDDI 920 may include a touch driver according to one or more embodiments. TDDI 920 may receive currents from the touch electrodes of the touch panel 940, may add the mean current of the currents in the opposite direction to the received currents to the received currents to generate output currents, and may generate touch data based on the generated output currents.

The touch panel 940 may overlap the display panel 930. The TDDI 920 may transmit the touch data to the host 910.

Figure 10:
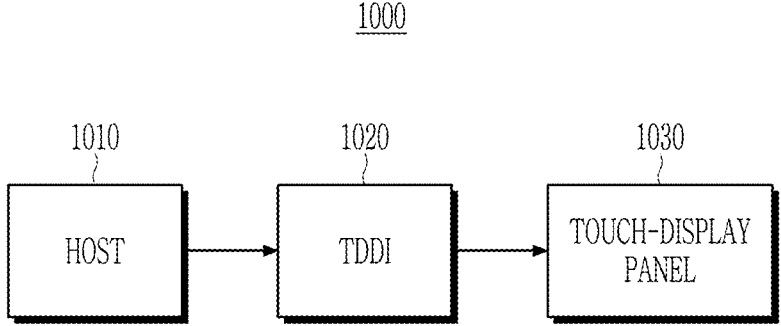
FIG. 10 shows a semiconductor system according to one or more embodiments.

FIG. 10 shows a semiconductor system according to one or more embodiments.

Referring to FIG. 10, the semiconductor system 1000 may include a host 1010, a TDDI 1020, and a touch-display panel 1030.

The host 1010 may receive data or instructions from the user, and may control the TDDI 1020 based on the data or instructions. The TDDI 1020 may drive the touch-display panel 1030 according to control by the host 1010. The TDDI 1020 may include a touch driver according to one or more embodiments. The TDDI 1020 may receive currents from the touch electrodes of the touch-display panel 1030, may add the mean current of the currents in the opposite direction to the received currents to the received currents to generate output currents, and may generate touch data based on the generated output currents. The TDDI 1020 may transmit the touch data to the host 1010.

In one or more embodiments, the respective components described with reference to FIG. 1 to FIG. 10 or combinations of two or more components may be realized into a digital circuit, a programmable or non-programmable logic device or array, and an application specific integrated circuit (ASIC).

In one or more examples, the current conveyors are implemented by circuitry configured to perform the operations of the current conveyors. The current conveyors may be referred to as current conveyor circuits. In one or more examples, the first and second current mirrors are implemented by circuitry configured to perform the operations of the first and second current mirrors. The first current mirror may be referred to as the first current mirror circuit, and the second current mirror may be referred to as the second current mirror circuit. In one or more examples, the common current subtractor may be implemented by circuitry configured to perform the operation of the common current subtractor. The common current subtractor may be referred to as the common current subtractor circuit. In one or more examples, the integrators are implemented by circuitry configured to perform the operations of the integrators. The integrators may be referred to as integrator circuits. In one or more examples, the amplifier may be implemented by circuitry configured to perform the operations of the amplifier. The amplifier may be referred to as the amplifier circuit. In one or more examples, the current buffer may be implemented by circuitry configured to perform the operations of the current buffer. The current buffer may be referred to as the current buffer circuit. In one or more examples, the analog-to-digital converter may be implemented by circuitry configured to perform the operations of the analog-to-digital converter. The amplifier may be referred to as the analog-to-digital converter circuit.

While the embodiments of the present disclosure have been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

16

What is claimed is:

1. A touch driver comprising:
a plurality of current conveyor circuits connected to a plurality of touch electrodes, the plurality of current conveyor circuits configured to (i) receive a plurality of first currents from the plurality of touch electrodes, and (ii) generate a plurality of second currents having opposite directions to the plurality of first currents, each of the plurality of current conveyor circuits comprising:
an amplifier circuit configured to receive one of the plurality of first currents and a touch voltage from a receiving terminal connected to a first touch electrode from among the plurality of touch electrodes,
a current buffer circuit connected to a first output terminal of the amplifier circuit, a second output terminal of the amplifier circuit, and the first touch electrode, and configured to receive an output voltage of the amplifier circuit and one of the plurality of first currents,
a first current mirror circuit connected to the first output terminal of the amplifier circuit, the second output terminal of the amplifier circuit, and the current buffer circuit, the first current mirror circuit configured to (i) receive the output voltage of the amplifier circuit, and (ii) generate a first mirroring current having a same direction as the plurality of first currents, and
a second current mirror circuit connected to the first output terminal of the amplifier circuit, the second output terminal of the amplifier circuit, and the current buffer circuit, the second current mirror circuit configured to (i) receive the output voltage of the amplifier circuit, and (ii) generate a second mirroring current having an opposite direction to the plurality of first currents, in which one of the plurality of second currents includes the second mirroring current;
a common current subtractor circuit configured to (i) receive the plurality of first currents and the plurality of second currents from the plurality of current conveyor circuits, and (ii) generate a plurality of output currents that are a sum of (a) a mean current of the plurality of second currents and (b) the plurality of first currents;
a plurality of integrator circuits configured to generate a plurality of output voltages by integrating the plurality of output currents; and
an analog-to-digital converter circuit configured to convert the plurality of output voltages into digital signals corresponding to touch data.

2. The touch driver of claim 1, wherein the amplifier circuit comprises:
an inverting input terminal connected to the receiving terminal, the inverting input terminal configured to receive the touch voltage, and
a non-inverting input terminal configured to receive a reference voltage,
wherein the amplifier circuit is configured to output the output voltage based on the touch voltage and the reference voltage.

3. The touch driver of claim 1, wherein
the current buffer circuit comprises:
first and second transistors connected between a first driving voltage and a second driving voltage, the first and second transistors comprising (i) gates connected to the output terminal of the amplifier circuit, and (ii) drains connected to the receiving terminal.

4. The touch driver of claim 3, wherein the first current mirror circuit comprises third and fourth transistors connected between the first driving voltage and the second driving voltage, wherein the third transistor comprises a gate connected to the first output terminal of the amplifier circuit, and the fourth transistor comprises a gate connected to the second output terminal of the amplifier circuit, wherein drains of the third transistor and the fourth transistor are connected to each other, wherein the second current mirror circuit comprises a fifth transistor and a sixth transistor connected between the first driving voltage and the second driving voltage, wherein the fifth transistor comprises a gate connected to the first output terminal of the amplifier circuit and the sixth transistor comprises a gate connected to the second output terminal of the amplifier circuit, and wherein a drain of the fifth transistor is connected to a second node, and a drain of the sixth transistor is connected to a first node.

5. The touch driver of claim 4, wherein the common current subtractor circuit comprises:

a seventh transistor diode connected between the first node of the plurality of current conveyor circuits and the first driving voltage, an eighth transistor connected between the first driving voltage and the drains of the third and fourth transistors, the eighth transistor having a gate connected to the first node, a ninth transistor diode connected between the second node and the second driving voltage, and a tenth transistor connected between the second driving voltage and the drains of the third and fourth transistors, the tenth transistor comprising a gate connected to the second node of the plurality of current conveyor circuits.

6. The touch driver of claim 5, wherein a current flowing to the seventh transistor diode or the ninth transistor diode is a sum of the plurality of second currents, and the mean current flows to the eighth transistor or the tenth transistor.

7. The touch driver of claim 5, wherein a size of the seventh transistor and the eighth transistor is m:1, wherein a size of the ninth transistor and the tenth transistor is m:1, and wherein m is an integer corresponding to a number of the plurality of touch electrodes.

8. The touch driver of claim 5, wherein the common current subtractor circuit comprises a plurality of eighth transistors and a plurality of tenth transistors, and wherein a number of the eighth transistors and the tenth transistors corresponds to the plurality of current conveyor circuits.

9. A touch device comprising:

a plurality of first touch electrodes extending in a first direction and aligned in a second direction crossing the first direction;

a plurality of second touch electrodes extending in the second direction and aligned in the first direction; and a touch driver configured to (i) apply a plurality of first driving signals to the plurality of first touch electrodes, (ii) receive a plurality of first currents from the plurality of second touch electrodes, and (iii) generate first touch data based on a plurality of first output currents that are a sum of (a) a first mean current that is a mean of a plurality of first opposite currents having an opposite direction to the plurality of first currents and (b) a respective first current of the plurality of first currents, the touch driver comprising:

a plurality of current conveyor circuits connected to a plurality of touch electrodes, the plurality of current conveyor circuits configured to (i) receive a plurality of first currents from the plurality of touch electrodes, and (ii) generate the plurality of first opposite currents, each of the plurality of current conveyor circuits comprising:

an amplifier circuit configured to receive one of the plurality of first currents and a touch voltage from a receiving terminal connected to a first touch electrode from among the plurality of touch electrodes, a current buffer circuit connected to a first output terminal of the amplifier circuit, a second output terminal of the amplifier circuit, and the first touch electrode, and configured to receive an output voltage of the amplifier circuit and one of the plurality of first currents, a first current mirror circuit connected to the first output terminal of the amplifier circuit, the second output terminal of the amplifier circuit, and the current buffer circuit, the first current mirror circuit configured to (i) receive the output voltage of the amplifier circuit, and (ii) generate a first mirroring current having a same direction as the plurality of first currents, and a second current mirror circuit connected to the first output terminal of the amplifier circuit, the second output terminal of the amplifier circuit, and the current buffer circuit, the second current mirror circuit configured to (i) receive the output voltage of the amplifier circuit, and (ii) generate a second mirroring current having an opposite direction to the plurality of first currents, in which one of the plurality of opposite phase currents includes the second mirroring current.

10. The touch device of claim 9, wherein the touch driver is further configured to (i) sequentially apply the plurality of first driving signals to the plurality of first touch electrodes and (ii) receive the plurality of first currents from the plurality of second touch electrodes for a first period.

11. The touch device of claim 10, wherein the touch driver comprises:

a common current subtractor circuit configured to (i) receive the plurality of first currents and the plurality of first opposite currents from the plurality of current conveyor circuits, and (ii) sum the first mean current and the plurality of first currents to generate the plurality of first output currents, a plurality of integrator circuits configured to generate a plurality of first output voltages by integrating the plurality of first output currents, and an analog-to-digital converter configured to convert the plurality of first output voltages into a first set of digital signals corresponding to the first touch data.

12. The touch device of claim 11, wherein the touch driver, for a second period next to the first period, is further configured to (i) simultaneously apply a plurality of second driving signals to the plurality of first touch electrodes, (ii) receive the plurality of second currents from the plurality of second touch electrodes, and (iii) generate second touch data based on second output currents that are a sum of (a) a second mean current that is a mean of a plurality of second opposite currents having an opposite direction to the plurality of second currents and (b) a respective second current from the plurality of second currents.

13. The touch device of claim 12, wherein the plurality of current conveyor circuits are connected to a plurality of second touch electrodes for the second period, the plurality of current conveyor circuits further configured to (i) receive the plurality of second currents from the plurality of second touch electrodes, and (ii) generate the plurality of second opposite currents, wherein the common current subtractor circuit is further configured to (i) receive the plurality of second currents and the plurality of second opposite currents from the plurality of current conveyor circuits, and (ii) add the second mean current and the plurality of second currents to generate the second output currents, wherein the plurality of integrator circuits are further configured to generate a plurality of second output voltages by integrating the second output currents, and wherein the analog-to-digital-converter is further configured to convert the plurality of second output voltages into a second set of digital signals corresponding to a plurality of second touch data.

14. The touch device of claim 13, wherein the touch driver, for a third period that occurs after the second period, is further configured to (i) simultaneously apply third driving signals to the plurality of second touch electrodes, (ii) receive a plurality of third currents from the plurality of first touch electrodes, and (iii) generate third touch data based on a plurality of third output currents that are a sum of (a) a third mean current that is a mean of a plurality of third opposite currents having an opposite direction to the plurality of third currents and (b) a respective third current from the plurality of third currents.

15. The touch device of claim 14, wherein the plurality of current conveyor circuits are connected to the plurality of first touch electrodes, the plurality of current conveyor circuits further configured to (i) receive the plurality of third currents from the plurality of first touch electrodes, and (ii) generate the plurality of third opposite currents for the third period, wherein the common current subtractor circuit is further configured to (i) receive the plurality of third currents and the plurality of third opposite currents from the plurality of current conveyor circuits, and (ii) sum the third mean current and the plurality of third currents to generate the plurality of third output currents, wherein the plurality of integrator circuits are further configured to generate a plurality of third output voltages by integrating the plurality of third output currents, and wherein the analog-to-digital converter is further configured to convert the plurality of third output voltages into a third set of digital signals corresponding to third touch data.

16. A display device comprising:

a first panel comprising a plurality of pixels;

a second panel on the first panel, the second panel comprising a plurality of touch electrodes; and a driving circuit configured to (i) provide a plurality of data signals that correspond to a plurality of pixels to the plurality of pixels of the first panel, (ii) receive a plurality of first currents from the plurality of touch electrodes, (iii) subtract a mean current of the plurality of first currents from the plurality of first currents, and (iv) generate a plurality of touch data based on the subtracted currents, the driving circuit comprising:

a plurality of current conveyor circuits connected to the plurality of touch electrodes, the plurality of current conveyor circuits configured to (i) receive a plurality of first currents from the plurality of touch electrodes, and (ii) generate the plurality of first opposite currents, each of the plurality of current conveyor circuits comprising:

an amplifier circuit configured to receive one of the plurality of first currents and a touch voltage from a receiving terminal connected to a first touch electrode from among the plurality of touch electrodes, a current buffer circuit connected to a first output terminal of the amplifier circuit, a second output terminal of the amplifier circuit, and the first touch electrode, and configured to receive an output voltage of the amplifier circuit and one of the plurality of first currents, a first current mirror circuit connected to the first output terminal of the amplifier circuit, the second output terminal of the amplifier circuit, and the current buffer circuit, the first current mirror circuit configured to (i) receive the output voltage of the amplifier circuit, and (ii) generate a first mirroring current having a same direction as the plurality of first currents, and a second current mirror circuit connected to the first output terminal of the amplifier circuit, the second output terminal of the amplifier circuit, and the current buffer circuit, the second current mirror circuit configured to (i) receive the output voltage of the amplifier circuit, and (ii) generate a second mirroring current having an opposite direction to the plurality of first currents, in which one of the plurality of opposite phase currents includes the second mirroring current.

17. The display device of claim 16, wherein the plurality of touch electrodes overlap the plurality of pixels on a plane.

18. The display device of claim 16, wherein the driving circuit is further configured to (i) apply a first driving signal with a first frequency to the plurality of touch electrodes for the first period, and (ii) apply a second driving signal with a second frequency that is lower than the first frequency for the second period.

* * * * *